US006577828B1

(12) United States Patent  
Ramos

(10) Patent No.: US 6,577,828 B1  
(45) Date of Patent: Jun. 10, 2003

(54) OZONE CATALYTIC CONVERTER UNIT OF OPTIMAL DESIGN

(75) Inventor: Elliot D. Ramos, Rochester, NY (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/453,084

(22) Filed: Dec. 2, 1999

(51) Int. Cl.[7] .................. G03G 21/00; B01D 50/00; B01D 53/34; B01D 19/00
(52) U.S. Cl. .................. 399/93; 399/98; 422/177; 55/472
(58) Field of Search .................. 422/170–181; 428/317.7; 355/215

(56) References Cited

U.S. PATENT DOCUMENTS

| | | | |
|---|---|---|---|
| 3,637,353 A | * 1/1972 | Smithson et al. ............ 422/181 |
| 3,983,393 A | 9/1976 | Thettu et al. ................ 250/326 |
| 4,096,691 A | * 6/1978 | Nohira et al. ............... 422/179 |
| 4,143,118 A | 3/1979 | Laing .......................... 423/210 |
| 4,175,107 A | * 11/1979 | Iwaoka et al. ............... 422/180 |
| 4,315,837 A | 2/1982 | Rourke et al. ............... 252/430 |
| 4,388,274 A | 6/1983 | Rourke et al. ............... 422/177 |
| 4,576,799 A | * 3/1986 | Worner et al. ............... 422/171 |
| 5,000,438 A | 3/1991 | Sardano et al. .............. 271/264 |
| 5,087,943 A | * 2/1992 | Creveling .................... 355/215 |
| 5,424,806 A | 6/1995 | Siegel .......................... 355/200 |
| 6,258,328 B1 | * 7/2001 | Torkkell et al. ............. 422/180 |
| 6,331,351 B1 | * 12/2001 | Waters et al. ............... 428/317.7 |

* cited by examiner

*Primary Examiner*—Glenn Caldarola
*Assistant Examiner*—Douglas W Rudnick
(74) *Attorney, Agent, or Firm*—Perman & Green, LLP

(57) ABSTRACT

A catalytic converter unit for neutralizing objectionable gas present in a gas discharge, such as the ozone-laden gas discharge from an electrographic copy machine, uniformly and at a high velocity or flow rate. The unit has a cylindrical housing having an upper cap with a central inlet for admitting the gas discharge, and a lower base having a central outlet for releasing the neutralized gas. A cylindrical catalyst element is removably attached to the lower base and centered within the housing to provide a uniform annular inlet chamber therebetween. The catalyst element is a cylindrical bed of gas neutralizing catalyst, such as ozone-neutralizing granular catalyst, forming a gas-permeable wall surrounding a central gas-discharge chamber opening to the outlet for releasing neutralized gas. The gas-permeable wall of catalyst is characterized by having a downwardly-and inwardly-inclined or conical surface surrounding the central gas discharge chamber, and the catalyst element is enclosed at the top by a domed cap adjacent the central inlet of the housing, whereby the gas discharge, such as ozone-laden gas, introduced through the central inlet is uniformly distributed at a uniform velocity into the annular chamber, through the catalyst wall for neutralization of the ozone, and into the central gas discharge chamber for release of the neutralized gas through the central outlet.

7 Claims, 4 Drawing Sheets

OZONE CATALYTIC CONVERTER UNIT OF OPTIMAL DESIGN

BACKGROUND OF THE INVENTION

1. Field of the Invention

The present invention relates to the well-known problem of ozone generation in electrostatic imaging machines, and provides a novel catalyst converter unit for receiving and uniformly neutralizing the ozoned air discharge from an electrostatic imaging machine, at a uniform high mass flow rate and with a minimum inlet pressure drop.

As is well known, ozone is generated in electrostatographic copying equipment as a result of corona discharge during sensitization of the recording surface of the photosensitive member. This is also true of other stations within the copier which employ corona discharge devices. Ozone emissions into the surrounding machine environment are controlled by catalytic "filtering" devices capable of conversion of the ozone to relatively harmless substances and are located in the copier exhaust stream. These filters are generally characterized as fixed-bed devices; that is, the catalyst is impregnated into a porous support which is integrated within the copier exhaust housing or is incorporated into the corona discharge electrode structure itself. Each type of ozone control system described hereinabove is limited in its ability to neutralize the ozone due to the physical constraints placed upon the catalyst containing element.

As will be appreciated, the amount of exposure of the ozone laden vapors to the catalyst determines the capacity and efficiency of ozone neutralization by the catalyst-containing element. Where the catalyst is entrained within or coated upon a porous or fibrous support, ozone laden vapors must be capable of penetration of this structure at a uniform high flow rate for uniform exposure to the catalyst for an adequate dwell time.

2. Prior Art

U.S. Pat. No. 4,143,118 discloses an electrographic apparatus incorporating a catalyst-impregnated filter screen associated with a corotron and heater element to achieve in-situ ozone pre-neutralization prior to the transmission of the exhaust gas to an ozone-neutralization unit having a granular catalyst bed filter. Back-flushing is required to remove entrapped particles from blocking the outlet end of the unit and creating a substantial pressure drop which substantially reduces the flow rate and capacity of the unit.

U.S. Pat. No. 4,315,837 discloses an electrographic apparatus incorporating a composite support matrix, such as glass beads, coated with ozone-neutralizing catalyst to form a filter element within the exhaust conduit of the apparatus. The catalyst matrix is held in place, at each end, by a foraminous member which permits passage of the exhaust gas and retention of the composite catalyst matrix without appreciable pressure drop thereacross. The ozoned air must pass through the length of the catalyst bed and therefore the catalyst at the upstream or inlet end of the bed is exposed to most of the ozone and becomes depleted more quickly. Also the length of the catalyst bed presents a resistance to the ozoned air flow, resulting in an objectionable pressure drop, particularly in the case of more modern electrostatic copying machines which have ozone generation rates many times greater than conventional machines and which require a uniform high flow rate for the adequate neutralization of the larger volumes of ozone generated.

U.S. Pat. No. 4,388,274 discloses an electrographic copying machine incorporating an exhaust system for transporting the ozone-laden gas from each of the corona stations to an ozone-neutralizing catalyst unit containing a thin layer of ozone-decomposing catalyst retained between foraminous screens. The catalyst unit is not designed to expedite the flow rate of the ozoned air through the unit and therefore produces an objectionable inlet pressure drop which reduces the efficiency of the unit with respect to neutralizing large volumes of ozone, as produced by modern machines. Also, the catalyst bed is not designed to produce an optimum, even exposure and usage of the available catalyst volume. This results in a non-uniform depletion of the catalyst in some areas of the bed, and a non-uniform and incomplete neutralization of the ozone in the air discharged.

SUMMARY OF THE INVENTION

The present invention provides a novel, convenient catalytic converter unit for neutralizing an objectionable gas present in a gas present in a gas discharge, such as the ozoned air generated by electrographic copy machines at a uniform high flow rate, minimum inlet pressure drop, and optimum, even or uniform velocity through an catalyst bed capable of neutralizing the objectionable gas. These features are provided by the unique design of the present catalytic converted units. These include a cylindrical housing having a streamlined aerodynamic air inlet, which reduces inlet pressure drop and thereby increases air flow or throughput, whereby large volumes of ozone can be neutralized efficiently without necessitating a large capacity unit. The present design also includes a graduated-thickness cylindrical catalyst bed through which the ozoned air is directed for uniform exposure to the catalyst for adequate dwell time to produce uniform, complete neutralization of the ozone at high flow rate.

BRIEF DESCRIPTION OF THE DRAWINGS

The foregoing aspects and other features of the present invention are explained in the following description, taken in connection with the accompanying drawings, wherein.

DETAILED DESCRIPTION OF THE INVENTION

Figure 1:
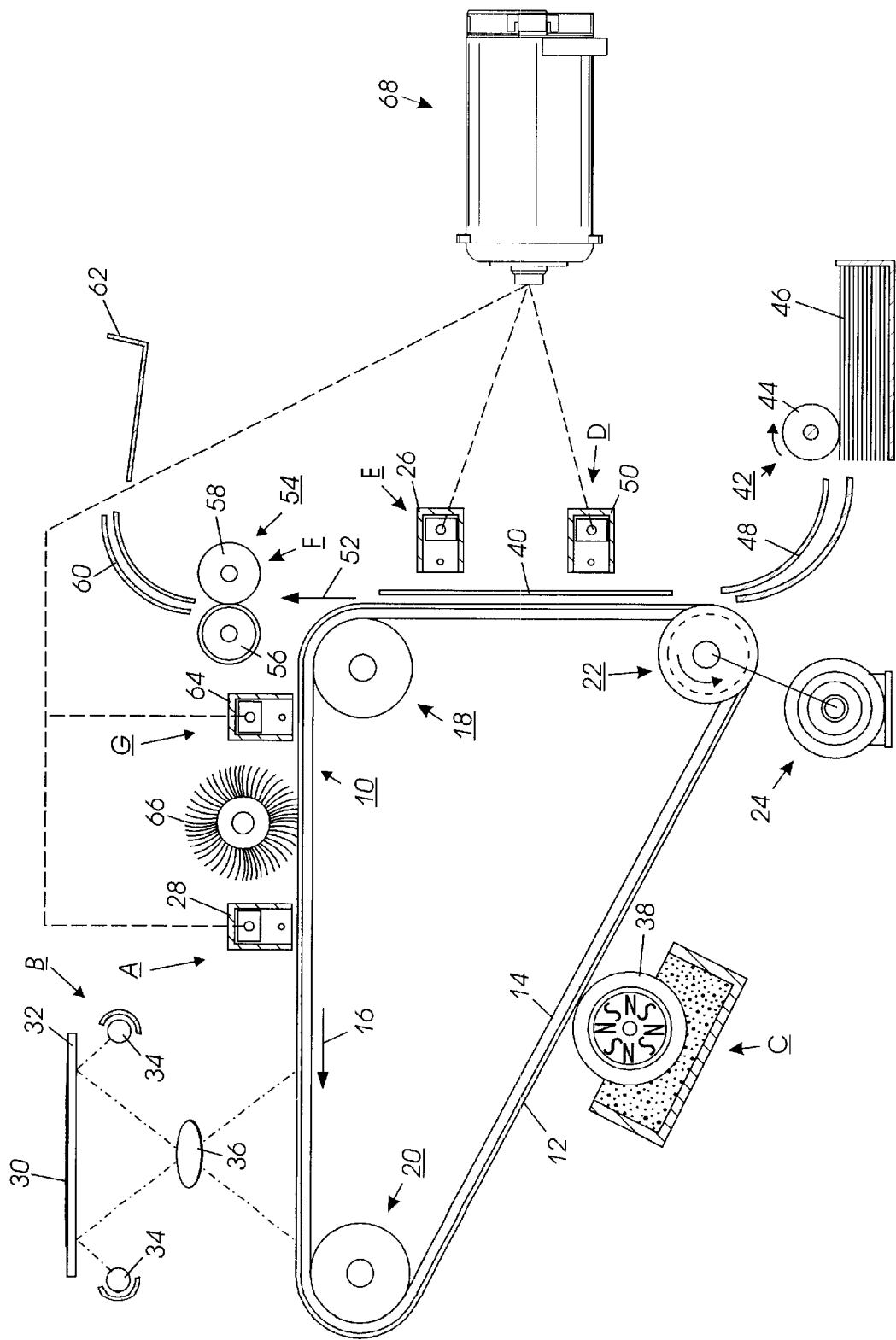
FIG. 1 is a schematic view of a representative electrographic copying machine incorporating an ozone catalytic converter unit according to the present invention.

FIG. 1 schematically depicts the various components of an illustrative electrostatographic copying machine incorporating the present novel catalytic converter apparatus for the collection and removal of, ozone and other noxious gases. However, it will become evident from the following discussion that the apparatus for the collection and removal of dirt, ozone and other noxious gases is equally suited for use in a wide variety of devices and is not necessarily limited in its application to the particular embodiment shown herein.

As shown in FIG. 1, the electrostatographic copying machine employs a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about a path of movement thereof. Belt 10 is entrained about stripping roller 18, tension roller 20 and drive roller 22 which is itself driven by motor 24.

The various processing stations employed in the illustrated copying machine will be now briefly described. Initially, a portion of the belt 10 passes through a charging station A. At charging station A, a corona generating or discharging device, indicated generally by the reference 28, charges photoconductibie surface 12 of belt 10 to a relatively high, substantially uniform potential. The corona discharging device 28 will be described in detail in connection with FIGS. 2 to 4 below.

Next, the charged portion of photoconductive surface 12 is advanced through exposure station B.i At exposure station B, an original document 30 is positioned face down upon transparent platen 32. Lamps 34 flash light rays onto original document 30. The light rays reflected from original document 30 are transmitted through lens 36 forming a light image thereon. The light image is projected onto the charged portion of photoconductive surface 12 to selectively dissipate the charge thereon. This records an electrostatic latent image on photoconductive surface 12 which corresponds to the informational areas contained within original document 30.

Thereafter, belt 10 advances the electrostatic latent image recorded on photoconductive surface 12 to development station C. At development station C, a magnetic brush developer roller 38 advances a developer mix into contact with the electrostatic latent image. The latent image attracts the toner particles from the carrier granules forming a toner powder image on photoconductive surface 12 of belt 10.

Belt 10 then advances the toner powder image to transfer station D. At transfer station D, a sheet of support material 40 is moved into contact with the toner powder image. The sheet of support material is advanced to transfer station D by a sheet feeding apparatus 42. Preferably, sheet feeding apparatus 42 includes a feed roller 44 contacting the upper sheet of stack 46. Feed roller 44 rotates so as to advance the upper most sheet from stack 46 into chute 48. Chute 48 directs the advancing sheet of support material into contact with the photoconductive surface 12 of belt 10 in a timed sequence so that the toner powder image developed thereon contacts the advancing sheet of support material at transfer station D.

Transfer station D includes a corona discharging device 50 which sprays ions onto the back side of sheet 40. This attracts the toner powdery image from photoconductive surface 12 to sheet 40. After transfer, the sheet 40 advances to detack station E. At detack station E, a corona discharging device 26 charges the back side of the sheet 40 so as to facilitate the separation of the sheet 40 and the toner powder image thereon from the photoconductive surface 12. After the detack station E, the sheet continues to move in the direction of arrow 52 onto a conveyor (not shown) which advances the sheet to fusing station F.

Fusing station F includes a fuser assembly, indicated generally by 54, which permanently affixes the transferred toner powder image to sheet 40. Preferably, fuser assembly 54 includes a heated fuser roller 56 and a backup roller 58. Sheet 40 passes between fuser roller 56 and backup roller 58 with the toner powder image contacting fuser roller 56. In this manner, the toner powder image is permanently affixed to sheet 40. After fusing, chute 60 guides the advancing sheet 40 to catch tray 62 for removal from the copying machine by the operator.

Invariably after the sheet of support material is separated from photoconductive surface 12 of belt 10, some residual particles remain adherent thereto. These residual particles are removed from photoconductive surface 12 at cleaning station G. Cleaning station G includes a preclean corona discharging device 64 and a rotatably mounted fibrous brush 66 in contact with photoconductive surface 12. The preclean corona discharging device 64 neutralizes any remaining electrostatic charge carried by the residual particles and they are then removed or cleaned from photoconductive surface 12 by the rotation of brush 66 in contact therewith. Subsequent to cleaning, a discharge lamp (not shown) floods photoconductive surface 12 with light to dissipate any residual electrostatic charge remaining thereon prior to the charging thereof from the next successive imaging cycle.

As can be gathered from the above description, there are four separate stations where corona discharging devices are employed in this illustrative electrostatographic copying machine, and where there is a need for the collection and removal of ozone and other noxious gases generated by such corona discharge devices. In accordance with the present invention, the ozone and other noxious gases, as well as any dirt particles or contaminants, are collected at these corona discharge devices, and are passed on through conduits (shown as dotted lines in FIG. 1) to an ozone catalytic converter unit 68 according to the present invention as more fully illustrated by FIGS. 2 to 4 of the drawings.

Figure 2:
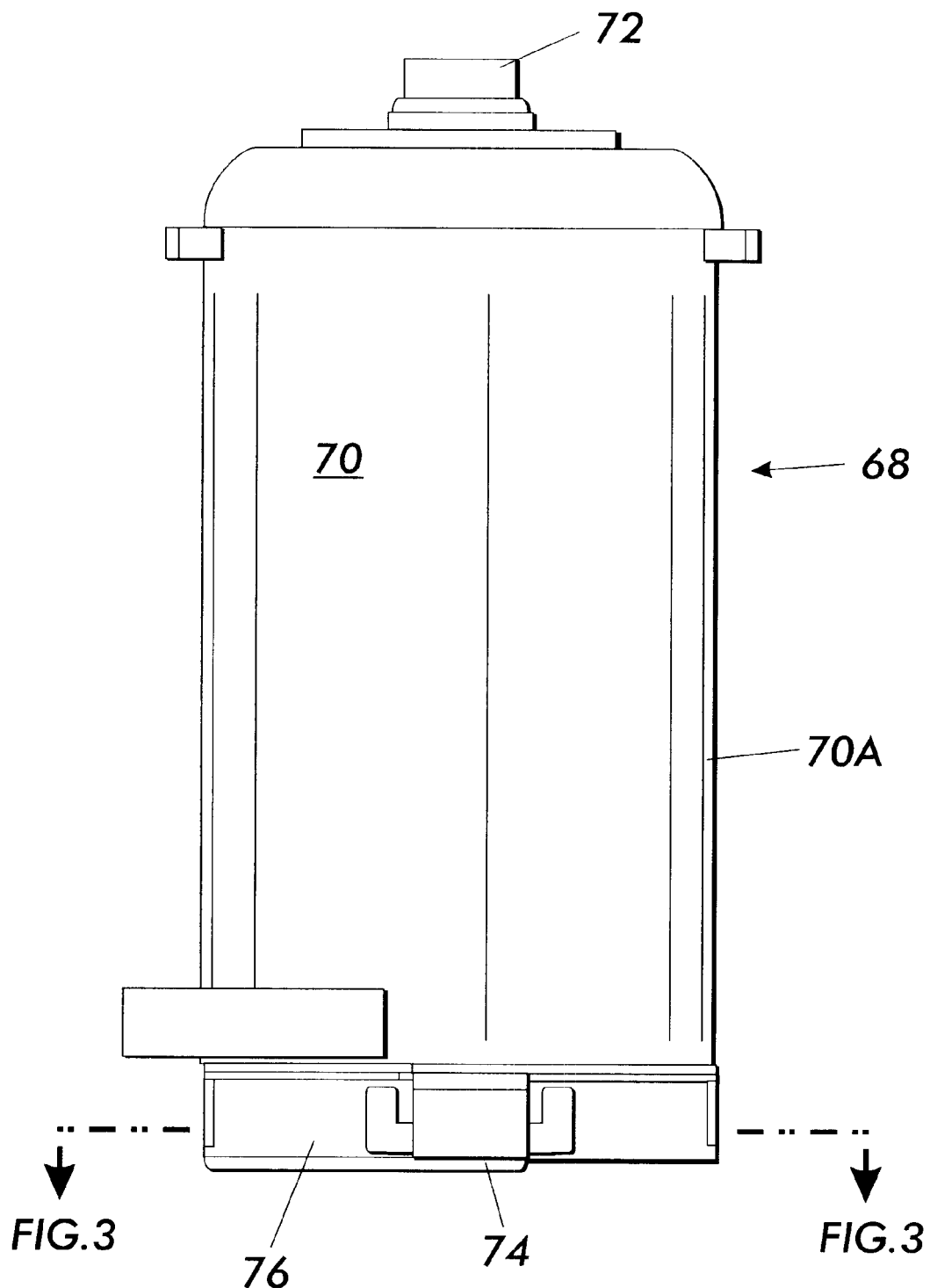
FIG. 2 is an elevational view of a catalytic converter unit according to the present invention.
Figure 3:
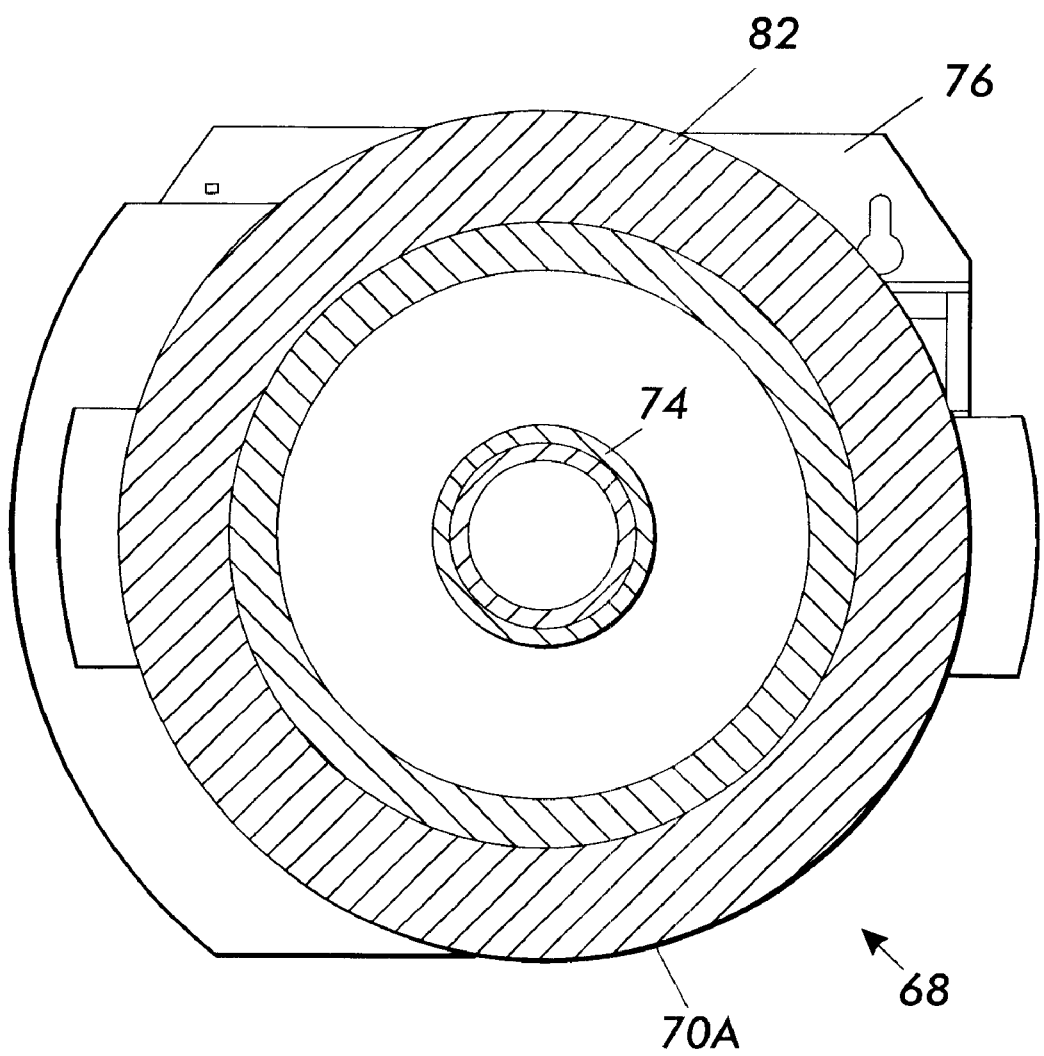
FIG. 3 is an end view of the unit FIG. 2, taken along the line 3—3 thereof.

Referring to FIGS. 2 and 3, the unit 68 illustrated thereby is a cylindrical housing 70 having an inlet fitting 72 for receiving dirty ozoned air from the corona discharge stations of the copy machine, land a discharge outlet 74 at the downstream end of the unit for discharging the air after it has been freed of dirt and ozone and other impurities.

The present ozone catalytic converter Unit 68 has a design which reduces the overall pressure drop across the unit by about 50%, when compared to equivalent size different configurations. This unit is intended to handle the ozone being generated by the print engine of modern electrostatic copying machines as a by-product of the xerographic imaging process. The ozone generation rate of these modern print engines is approximately five times, on a mass basis, higher than the highest currently produced by any earlier machines and handled by presently existing ozone catalytic converters. The optimum usage of the available catalyst volume which keeps the overall size of the unit to the minimum necessary for the desired conversion efficiency, is a requirement for the modern architecture machines due to severe spatial constraints and their very high ozone generation rate. The optimization of the flow regime critical characteristics enable the extension of the useful life of the catalytic converter unit. This is also critical, since the modern machines are going to have a more strenuous duty cycle than any previous machine, together with a longer useful life expectancy. The novel design of the present catalytic converter unit shown in FIGS. 2 to 4 includes a cylindrical housing 70 having a single central upper gas flow inlet 72 opening against the rounded dome 84 of a central, cylindrical catalyst bed member 80 uniformly-spaced from the cylindrical interior surface 70B of the housing 70 to provide a uniform annular space or chamber 86 therebetween. The inner wall 70B is radiused adjacent the periphery of the dome 84 to provide a smooth peripheral inlet to the annular chamber 86, to improve the flow rate of the ozoned air and reduce the pressure drop.

The unit 68 is mounted on the frame of the copy machine in a convenient location, such as by means of a rear bracket 76, and the outlet 74 may be connected to a vent means.

Figure 4:
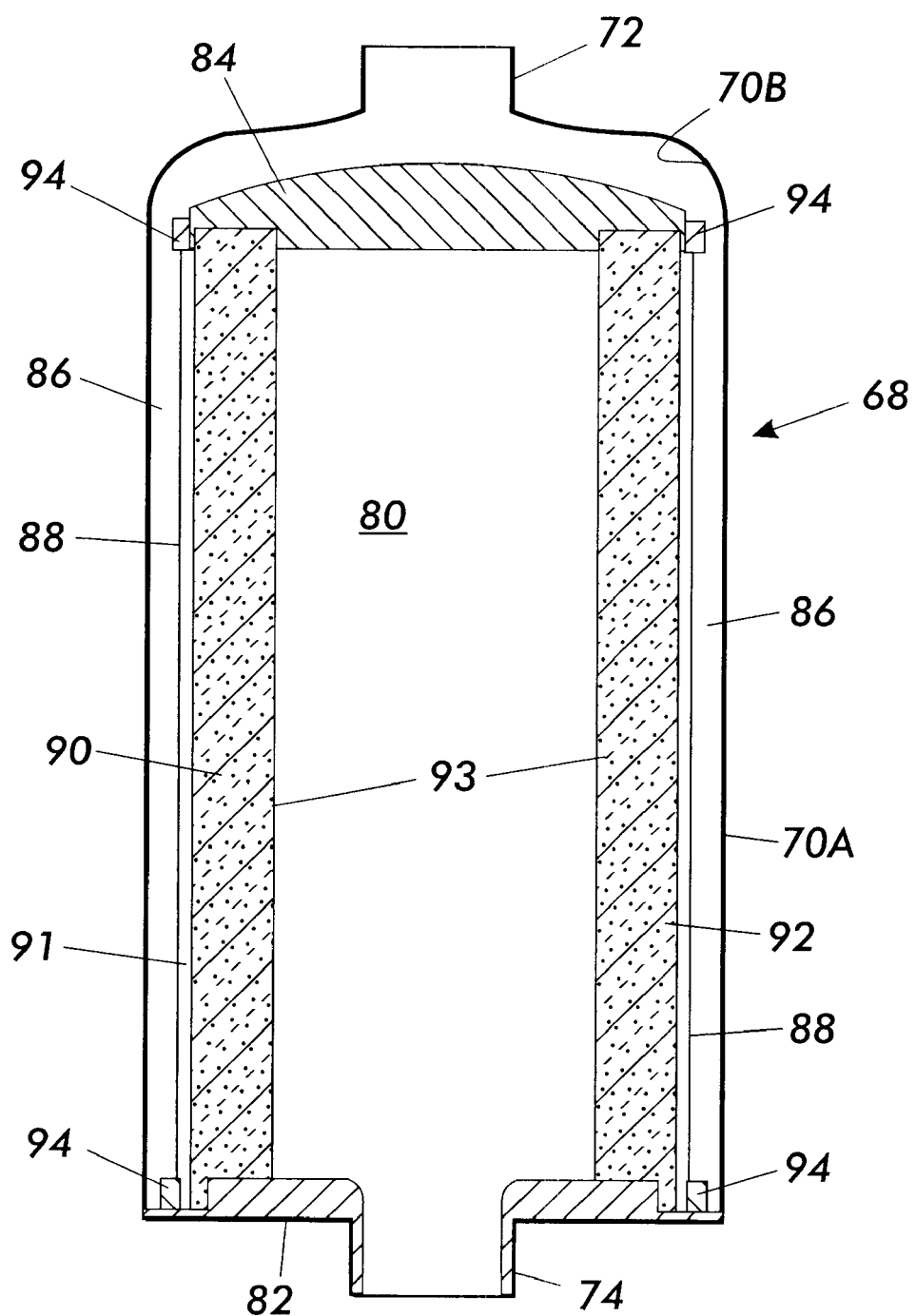
FIG. 4 is an axial cross-sectional view of the ozone catalytic converter unit of FIGS. 2 and 3.

Referring to the cross-sectional view of FIG. 4, the housing 70 of the present ozone catalytic converter unit 68 comprises an outer cylindrical shell or casing 70A which is easily removable and which encloses a preferred filter/catalyst cylindrical member 80 which is fixed to an end cap 82 of the unit 68, or otherwise supported with its outer surface closely spaced from the inner surface 70A of the housing 70 of unit 68 to form a uniform annular space or passage 86 therebetween. The upper end of the filter catalyst member 80, adjacent the unit inlet fitting 72, is sealed by a domed cap 84 having an aerodynamic outer surface which uniformaly distributes the dirty ozoned inlet gas radially-outwardly over the radiused inner wall 70B of the casing 70A into the annular passage 86 where its only escape to outlet 74 is through the filter/catalyst member 80. The outer shell or casing 70A of the housing 70 may be threadably or frictionally engaged on the end cap 82 so as to be easily removable, without tools, to provide access to the filter/catalyst member 80, such as for replacement of the catalyst bed 90 within the catalyst screen assembly 91.

The novel catalyst member 80 comprises a preferred but optional outer dirt filter screen sleeve 88 which completely surrounds the inner tubular bed 90 of granular catalyst confined between air-permeable sleeves 92 and 93. The filter screen sleeve 88 is removably supported in spaced relation to the outer retaining; sleeve 92 of the catalyst bed 90, such as by means of confinement between end bushings 94, so that the filter screen sleeve 88 can be removed for periodic cleaning or replacement, as necessary.

A preferred dirt filter screen sleeve 88 is a fine mesh screen of polytetrafluoroethylene (PTFE) which filters out and traps dirt and contaminant particles of 1 micron size or larger and precludes them for contacting and poisoning the catalyst, which is widely known to be the principal cause of failure of catalystic converters. The present design enables the catalyst bed to be effective for the life of the apparatus by shielding it against contact with dirt and other contaminants, and by enclosing the filter/catalyst member 80 within an outer cylindrical housing shell or casing 70A which is easily removable from the housing base or end cap 82 to facilitate the removal of the dirt filter sleeve 88 for periodic cleaning and replacement, to preserve the useful life of the catalyst.

The present catalyst bed 90 comprises a compacted bed of fine granular ozone-decomposing catalyst particles which convert ozone gas to harmless oxygen gas upon contact. The granular bed is confined in a retaining screen assembly 91 comprising inner and outer gas-permeable sleeves 92 and 93 such as stainless steel woven wire cloth of 16×16 mesh, 0.023" diameter wire, 0.04" width openings, 39.9% open area.

The configuration of the present granular catalyst bed 90 and its retaining screen assembly 91 is a critical feature of the present invention and is illustrated in cross-section in FIG. 4. The bed 90 incorporates a screen assembly 91 having a cylindrical outer surface screen 92 and a conical inner surface screen 93 that confine the active catalyst media bed 90 within an also cylindrical housing 70 with a streamlined single inlet 72 and a single outlet 74. All of the aforementioned surfaces are concentric.

According to a preferred embodiment of the catalytic converter unit design illustrated by FIG. 4 of the drawings, the length of the catalyst bed 90 is about 357 mm, its diameter is about 178 mm and its wall thickness gradually increases from about 25.4 mm at the inlet end to about 29.4 mm at the outlet end. Thus, the thickness of the catalyst bed gradually increases by about 1.12% over its length. The annular space 86 between the container wall 70A and the outer catalyst screen 92 is about 16.4 mm.

The catalyst media bed 90 unique design promotes a very uniform air velocity distribution along its length. This uniformity, which is flow-dependent, is obtained by tapering the internal surface of the bed accordingly for the ozonated air volumetric flowrate rating required of the unit. The catalyst media bed of a modern machine design which handles 24 PPMV of ozone and 37 SCFM of air, was designed to be 4 mm thicker on the outlet end of the media element as compared to the inlet end in order to achieve optimum velocity uniformity. This same optimization technique can be utilized to optimize the flow regime critical characteristics of any design as a function of the flowrate once the catalyst volume required for ozone conversion is known. Such tapering has not been used in the past to achieve velocity uniformity in a catalytic converter application.

The design's velocity uniformity results in uniform mass flowrate through the catalyst media, along the bed length. This in turn assures that all of the available surface area and consequently all of the catalyst volume is being used and also in an even fashion. That is, every section of the catalyst media 90 will experience the same loading. As a direct result of this mass flow uniformity, the catalytic converter unit life-span will be increased and the required size of the unit minimized.

As is clear from the foregoing, and FIG. 4 of the drawings, the annular space or chamber 86 is of uniform dimensions from the top to the bottom of the catalyst bed 90, while the thickness of the catalyst bed 90 gradually increases from top to bottom. This assures that the ozoned air entering the bed 90 at the bottom of the chamber 86 has at least the minimum necessary dwell time.

Filling and/or refilling of the catalyst screen assembly 91 is accomplished by filling the space between the screen sleeves 92 and 93 with catalyst granules, vibrating at 100 to 200 cycles/min. for about 30 seconds at 1.3 to 1.6 amplitude to cause compacting or settling of the granules, and repeating the process until no further settling occurs.

The catalytically active granular material suitable for use in the apparatus and method of the instant invention can be virtually any material disclosed in the art which is capable of conversion of objectionable gases such as toxic, poisonous, explosive and otherwise dangerous gases including ozone, carbon monoxide carcinogens, etc., to relatively innocuous products. Typical catalytically active materials which are suitable for this purpose with ozone gas include those substances which have been historically termed "hopcalites".

Briefly, these catalysts comprise metal oxides or basic sulfates, acetates or carbonates of the more common metals, either alone or in admixture. The se substances are prepared under conditions intended to produce a finely divided granular material. Among the metals whose oxides, basic carbonates, basic acetates and basic sulfates have been found to be catalytically active are: manganese, cobalt, copper, iron, nickel, bismuth, lead and silver. In practice, mixtures of two or more of the above materials are preferable to a single compound acting alone. Moreover, catalytic activity of these compounds or mixtures of these compounds can be further enhanced by the addition of very minor quantities of finely divided metals, particularly metals of the platinum group, (these metals being regarded as promoters).

While the present two-stage filter device is illustrated as an ozone gas catalytic converter, it should be understood that the present design can be used with any air/gas treatment device in which it is desirable to prefilter the air/gas in advance of catalytic treatment to remove odor, poisonous gases and/or other objectionable or unwanted gases, and/or to regulate the air/gas to a uniform high flowrate, minimum inlet pressure drop, and optimum, even or uniform dwell time exposure to a catalyst bed.

While the invention has been described in detail with reference to specific preferred embodiments, it will be appreciated that various modifications may be made from the specific details without departing from the spirit and scope of the invention.

What is claimed is:

1. A catalytic converter unit for neutralizing objectionable gas present in gas discharge at a uniform high velocity, comprising an elongate housing having an upper cap portion having a central inlet for admitting said gas discharge said upper cap portion being radiused and rounded adjacent said central inlet to facilitate the uniform distribution of the gas discharge into said housing, and having a lower base portion having an outlet for releasing the neutralized gas; a cylindrical catalyst element attached to the lower base portion and centered within said housing to provide a uniform annular chamber therebetween; said catalyst element comprising a cylindrical bed of granular catalyst, capable of neutralizing said objectionable gas, forming a gas-permeable wall surrounding a central gas-discharge chamber opening to said outlet for releasing neutralized gas, said gas-permeable wall of catalyst having a downwardly-and inwardly-inclined surface surrounding said central gas discharge chamber to provide a catalyst bed which gradually increases in thickness towards said outlet, and said catalyst element being enclosed at the top by a contoured, domed, rounded cap 84 adjacent the inlet of said upper cap portion, whereby said gas discharge introduced through said central inlet is uniformly distributed at a uniform high velocity over said cap and radially-outwardly against the radiused, rounded surface of the upper cap portion into said annular chamber, through said catalyst wall for neutralization of the objectionable gas, and into said central gas discharge chamber for release of the neutralized gas through said outlet.

2. A catalytic converter unit according to claim 1 in which said cylindrical catalyst unit comprises a cylindrical outer gas-permeable sleeve and a conical inner gas-permeable sleeve containing therebetween the bed of granular catalyst.

3. A catalytic converter unit according to claim 2 in which the outer and inner gas-permeable sleeves comprise stainless steel woven wire cloth.

4. A catalytic converter unit according to claim 1 in which said cylindrical catalyst element is removably-attached to said lower base portion, and said lower base portion is removably attached to said elongate housing, to permit replacement of the granular catalyst.

5. A catalytic converter unit according to claim 1 in which cylindrical catalyst element further comprises a cylindrical outer gas permeable dirt filter sleeve surrounding and spaced from said cylindrical bed of catalyst to filter contaminants from said ozone-laden gas before it contacts the bed of catalyst.

6. A catalytic converter unit according to claim 5 in which said dirt filter sleeve comprises a fine mesh screen of polytetrafluoroethylene.

7. An ozone gas-neutralizing catalytic converter unit for neutralizing the ozone-laden gas discharge from an electrographic copy machine, at a uniform high velocity, comprising a cylindrical housing having an upper cap portion having a central inlet for admitting said ozone-laden gas discharge, said upper cap portion being radiused and rounded adjacent said central inlet to facilitate the uniform distribution of the gas discharge into said housing, and having a lower base portion having a central outlet for releasing the neutralized gas; a cylindrical catalyst element attached to the lower base portion and centered within said housing to provide a uniform annular chamber therebetween; said catalyst element comprising a cylindrical bed of ozone-neutralizing granular catalyst forming a gas-permeable wall surrounding a central gas-discharge chamber opening to said outlet for releasing neutralized gas, said gas-permeable wall of catalyst having a downwardly-and inwardly-inclined surface surrounding said central gas discharge chamber to provide a catalyst bed which gradually increases in thickness towards said outlet, and said catalyst element being enclosed at the top by a rounded, domed cap adjacent the central inlet of said housing, whereby said ozone-laden gas introduced through said central inlet is uniformly distributed at a uniform high velocity over said domed cap and radially-outwardly against the radiused rounded surface of the upper cap portion and into said annular chamber, through said catalyst wall for neutralization of the ozone, and into said central gas discharge chamber for release of the neutralized gas through said outlet.

* * * * *